Patented Nov. 18, 1924.

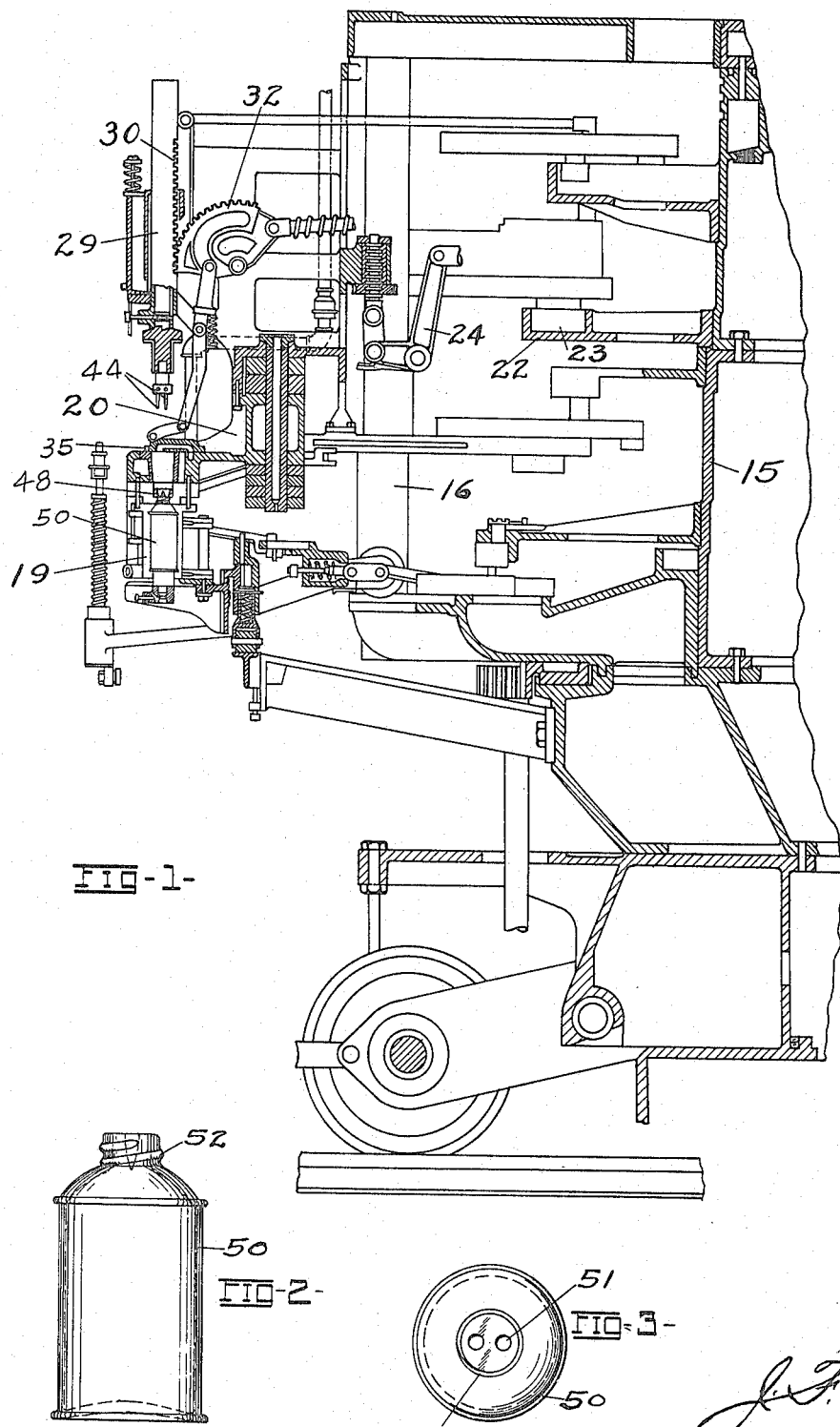

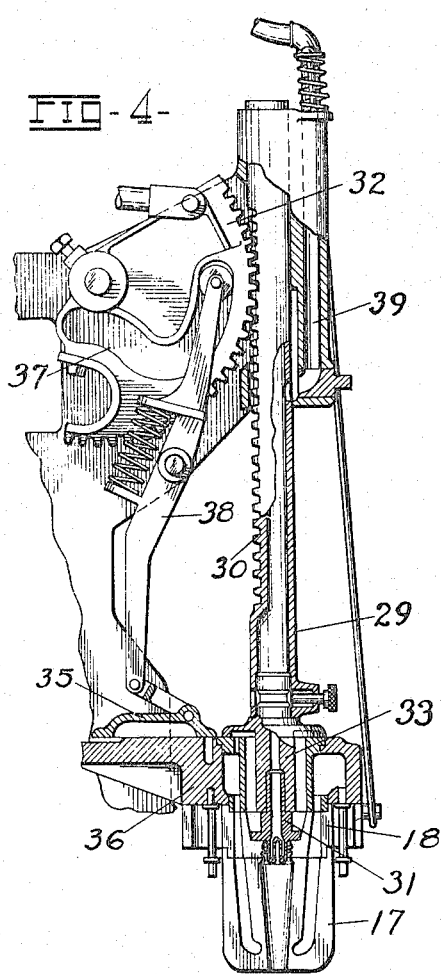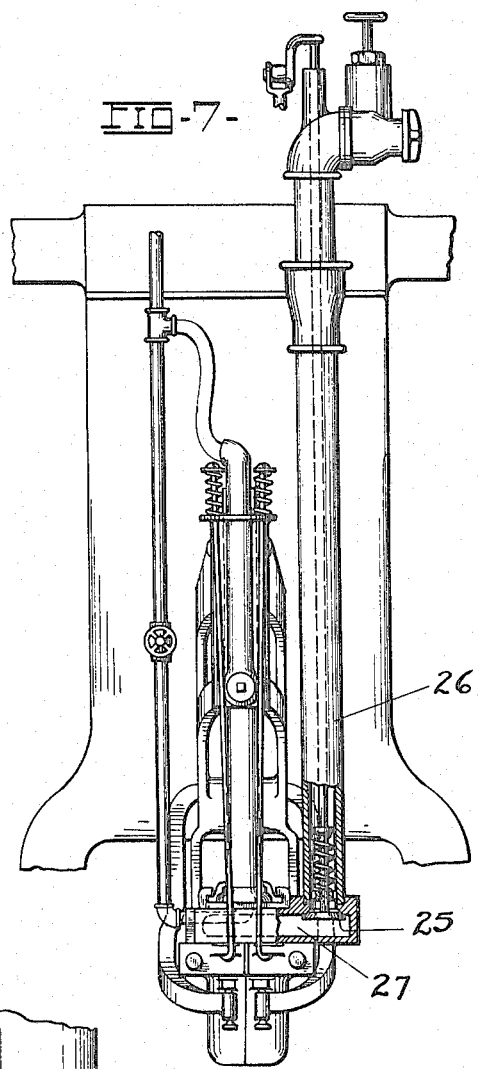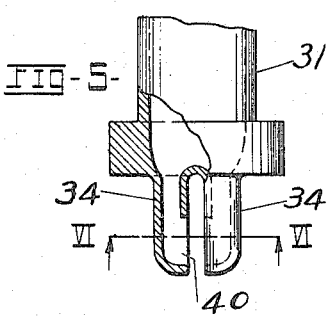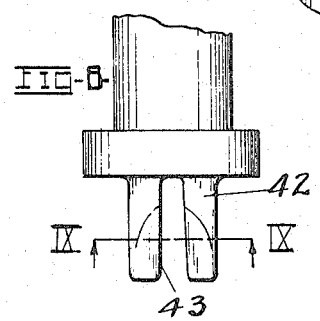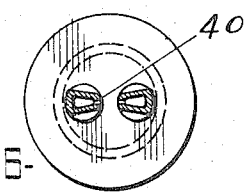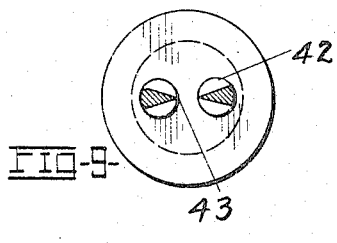

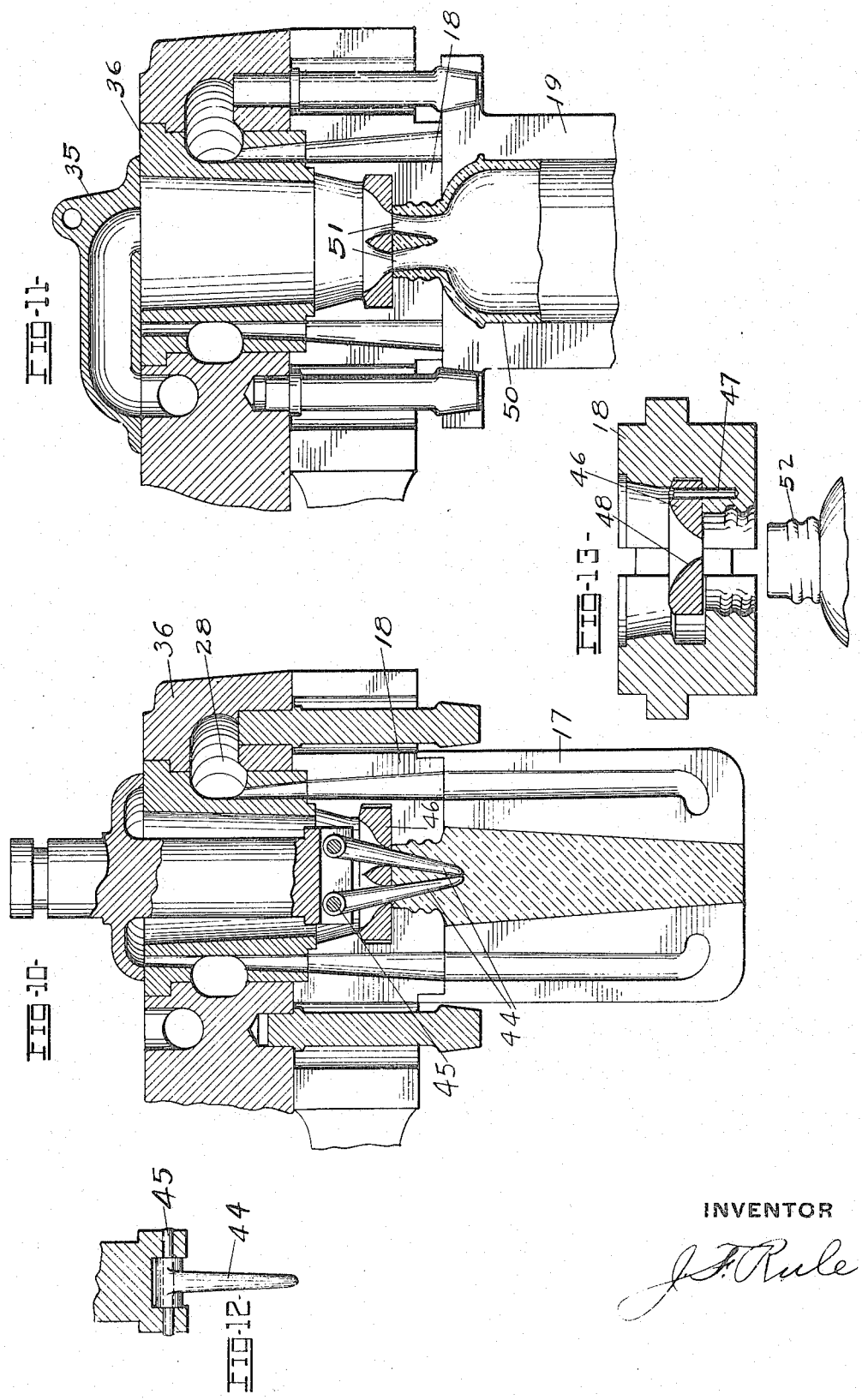

1,515,885

UNITED STATES PATENT OFFICE.

JOHN F. RULE, OF TOLEDO, OHIO, ASSIGNOR TO THE OWENS BOTTLE COMPANY, OF TOLEDO, OHIO, A CORPORATION OF OHIO.

MANUFACTURE OF GLASS CONTAINERS.

Application filed August 14, 1922. Serial No. 581,673.

*To all whom it may concern:*

Be it known that I, JOHN F. RULE, a citizen of the United States, residing at Toledo, in the county of Lucas and State of Ohio, have invented new and useful Improvements in the Manufacture of Glass Containers, of which the following is a specification.

My invention relates to the manufacture of glass bottles or other containers. An object of the invention is to provide a practical method and means for manufacturing a bottle or container having two openings extending through the neck thereof and communicating with the interior of the container.

At the present day, there is on the market a line of bottles for containing ink or other liquids, in which a plug is placed in the bottle neck and provided with separate openings therethrough, one to permit the liquid to be poured out, the other to permit the entrance of air. This plug, which is made of some composition material, is fitted in the neck of the bottle with an intermediate lining of cork or the like. Such a construction is expensive to manufacture and is open to various other objections.

An object of the present invention is to overcome such objections by the provision of an integral bottle or container have restricted neck openings, and to further provide a novel and practical method and mechanism for the manufacture of such container.

Other objects of the invention will appear hereinafter.

In the accompanying drawings:

Figure 1 is a sectional elevation showing a portion of a bottle blowing machine adapted for making bottles in accordance with the principles of my invention.

Figure 2 is an elevation of a bottle.

Figure 3 is a top plan view of the same.

Figure 4 is a sectional elevation showing the blank mold, neck mold, blowing head, plunger, and means for operating the plunger.

Figure 5 is a part sectional fragmentary view showing one form of plunger tips.

Figure 6 is a section at the line VI—VI on Figure 5.

Figure 7 is a front elevation showing a blank mold, vacuum chamber, valve and associated parts.

Figure 8 is a view showing a modified form of plunger tips.

Figure 9 is a section at the line IX—IX on Figure 8.

Figure 10 is a sectional view showing the blank mold, neck mold, blowing head and plunger, a still further form of plunger tips being shown in this view.

Figure 11 is a sectional elevation showing the neck mold, finishing mold, blowing head, and the bottle blown to finished form.

Figure 12 is a detail of one of the plunger tips shown in Figure 10.

Figure 13 is a sectional view of the neck mold partly opened to permit the release of the finished bottle.

For the purpose of illustration, the invention is herein shown in connection with an Owens type of automatic bottle blowing machine, such as shown and described for example, in the patent to La France, No. 1,185,687, June 6, 1916, to which reference may be had for a full disclosure of the construction and operation of a machine of this type.

The machine comprises a stationary central column 15 on which is mounted a continuously rotating mold carriage 16. On the carriage are mounted sets of molds each comprising a blank mold 17, a neck mold 18 and a finishing mold 19. Each blank mold with its co-operating neck mold is mounted on a dipping frame or head 20. As the carriage rotates, the blank mold is brought to a position over a tank of molten glass and the head 20 is then lowered to bring the mold in contact with the glass, permitting the mold to be charged by suction. The lifting and lowering of the head 20 is effected by means of a stationary cam 22 on which runs a roll 23 on the mold carriage having operating connections (not shown) with a bell crank 24 connected to the head 20. When the blank mold is in gathering position, the air is exhausted therefrom and from the neck mold which at this time is in register with the blank mold, by opening a valve 25 (Fig. 7). This permits the air to be exhausted through a pipe 26 leading to a suitable source of vacuum, said pipe opening through the valve 25 to a vacuum chamber 27 in communication through a passageway 28 (Fig. 10) with the neck mold.

Initial blow openings are formed in the glass within the neck of the bottle by means of plunger tips carried by a vertically reciprocating plunger 29. The plunger is formed with a rack 30 in mesh with a gear segment 32 operated by means of a stationary cam having operating connections with the gear segment. A plunger head 33 removably connected to the lower end of the rod 29, carries a pair of plunger tips 34 (Figs. 4 to 6). The tips 34 are formed on a hollow stem 31 removably held in the head 33, permitting the tips to be readily removed or replaced by other tips.

While the charge of glass is being drawn into the mold the plunger is in its lowered position with the tips 34 projecting into the neck mold so as to be embedded in the plastic glass, the tips when withdrawn leaving initial blow openings in the glass. As the plunger is withdrawn, a slide valve 35 moves horizontally over the blowing head 36 and air under pressure is supplied through said valve and head for blowing the blank. The valve 35 is actuated by a cam 37 formed on the segment 32 and operating through a lever 38 connected to the valve.

The plunger rod 29 is hollow and when in its lowered position (Fig. 4) is in communication with an air pressure pipe 39 through which air pressure may be automatically supplied at any desired intervals, the supply being controlled by suitable valve mechanism such as disclosed in the La France patent above referred to. The plunger tips 34, as shown in Figures 5 and 6, are also hollow and in communication with the hollow stem 29. Narrow openings or slits 40 are formed in the adjacent walls of the plunger tips, said openings facing each other. Before the plunger is withdrawn, air pressure may be transmitted therethrough to the tips. The compressed air at the slots 40 tends to force its way through the plastic glass between said slots and thus form an opening or passageway between said tips, so that when the plunger is withdrawn the two initial blow openings formed by the tips are connected by an air passage below the upper surface of the glass in the neck.

After the plunger has been withdrawn and the blank mold 17 opened, leaving the blank of glass suspended from the neck mold, the finishing mold 19 is brought up into position and closed around the blank in register with the neck mold, as shown in Figure 11. Air under pressure is then supplied through the blowing head 36 and the bottle blown to its finished form. There is thus formed in a single piece, a bottle having two comparatively small vertical openings through the neck thereof, both said openings communicating with the space forming the interior of the bottle.

The purpose of supplying air pressure through the slots 40 in the plunger tips is to insure in the finished bottle, communication between both blow openings and the interior of the bottle. Without some special provision for initially breaking through the glass between the tips, there is a tendency for all the air, during the blowing of the bottle, to pass through a single blow opening. This is probably due to the fact that the glass immediately surrounding the initial openings is chilled to a greater or less extent by the plunger tips. If, in the final blowing, the air breaks through the chilled wall or skin of glass formed by one tip before the other gives way, the resistance to the air is immediately lowered so that most or all the air follows through the same opening. As a result, the other initial opening is shut off by a partition or wall of glass from the body portion of the bottle. By the initial blowing through the slots 40 this isolation of the neck opening is avoided.

Figures 8 and 9 show a modified form of plunger tip. In this instance the plunger tips 42 are made solid but with their upper ends circular, but are tapered down to a wedge-shape toward their lower ends, with their edges 43 opposite each other. When the plunger is withdrawn, correspondingly shaped blow openings remain in the plastic glass. When the final blowing of the bottle takes place, the glass yields first at the edges 43 and the air breaks through the glass between the openings, thereby establishing an air passage between the openings. The fact that the glass gives way first at the edges 43 is probably due in a measure to the shape of the openings, and further to the fact that the glass forming the walls of the openings is less chilled at and adjacent to these edges, owing to the comparatively small body of metal in the corresponding portions of the plunger tips.

Figures 10 to 13 illustrate a modified construction wherein pivoted plunger tips or rods 44 are employed. These tips are pivotally mounted by means of transverse pivot pins 45 secured in the lower end of the plunger head. The rods 44 are mounted to swing freely on the pins 45. A guiding member 46 is attached to one of the horizontally separable sections of the neck mold 18. A dowel-pin 47 fixed to the neck mold section may be used for this purpose, the guide block 46 being formed with an opening to receive said pin. With this construction, the guide block may readily be removed by lifting it off the pin. The guide block is formed with two openings 48 by which the pins 44 are guided as they move up and down in the neck mold. The walls of the openings 48 are flared or inclined to properly guide the tips 44.

The openings 48 are so spaced that the lower ends of the rods 44 will be positively guided inwardly as the plunger descends, so that the tips approach each other and may be caused to touch, as shown in Figure 10. After the charge of glass has been drawn into the mold and as the plunger is withdrawn, the lower ends of the rods 44 are separated. After the plunger has been raised to a position above the blowing head 36 and the valve 35 brought into position (Fig. 11) the bottle 50 is blown to its final form, as shown in Figure 11, with the two separate openings 51 extending vertically through the neck of the bottle. Although the pins 44 are in contact, as shown in Figure 10, when the mold in charged, yet it will be understood that actual contact is not always necessary, as under suitable conditions the air will readily break through from one blow opening to the other if the wall of glass therebetween is thin enough. The neck of the bottle may be formed with an integral screw thread 52 for the attachment of a closure cap for sealing the bottle.

Modifications may be resorted to within the spirit and scope of my invention.

What I claim is:

1. In a machine for making hollow containers, the combination of a mold, means for charging the mold, means for forming initial blow openings in the neck portion of the charge, and means to blow the charge in the mold to a hollow form in which the interior of the container comprises a single chamber with which said openings communicate.

2. In a glass forming machine, the combination of a mold to receive a charge of molten glass, means to form separate initial blow openings in the glass in the mold, said openings extending inward from the exterior surface of the glass, and means to supply air under pressure through said openings and blow the glass to a hollow form comprising a single chamber having outlets through said openings.

3. In a glass forming machine, the combination of a mold to receive a charge of molten glass, mechanism to form separate initial blow openings in the glass in the mold, and automatic means co-operatively connected with said mechanism to supply air under pressure simultaneously to both said openings and blow the glass to a hollow form comprising a single chamber having outlets through said openings.

4. In a glass forming machine, the combination of a mold to receive a charge of glass, a plunger movable toward and from the mold, a plurality of tips on the plunger arranged to enter the glass and form separate openings therein, and automatic means cooperating with the plunger to blow the glass to hollow form when the plunger is withdrawn from the mold.

5. In a glass forming machine, the combination of a neck mold, a blank mold, a plunger movable toward and from the neck mold, separate tips on the plunger arranged to enter the neck mold and form separate openings in a charge of glass in the mold, and automatic means cooperating with the plunger to expand the glass to the form of a receptacle having outlets through said openings.

6. In a glass forming machine, the combination of a neck mold, a blank mold, a plunger movable toward and from the neck mold, separate tips on the plunger arranged to enter the neck mold and form separate openings in a charge of glass in the mold, and means to supply air under pressure to said openings while the glass is supported in the neck mold, for blowing the glass to hollow form.

7. In a glass blowing machine, the combination of a mold, means to form initial blow openings in the plastic glass in the mold, means to blow the glass to hollow form by air supplied through said openings, and means to cause the air to break through from one to the other of said openings whereby both openings are caused to communicate with the hollow interior of the blown article.

8. In a glass blowing machine, the combination of a neck mold, a plunger movable toward and from the neck mold, hollow tips on said plunger to enter the neck mold for forming initial blow openings in the glass in the mold, said tips formed with openings in their adjacent walls, and means to supply air under pressure through said tips while in the glass.

9. In a glass blowing machine, the combination of a neck mold, a plunger movable toward and from the neck mold, hollow tips on said plunger to enter the neck mold for forming initial blow openings in the glass in the mold, said tips formed with openings in their adjacent walls, means to supply air under pressure through said tips while in the glass and thereby force an air passage through the glass fom one tip to the other, and means to supply air under pressure to said initial blow openings after the plunger has been withdrawn.

10. In a glass forming machine, the combination of a mold to receive plastic glass, a plunger movable toward and from the mold, tips on said plunger arranged to project into the mold and form initial blow openings in the glass in the mold, and means to cause said tips to approach each other within the mold and to move apart before they are withdrawn from the mold.

11. In a glass forming machine, the combination of a mold to receive plastic glass, a plunger movable toward and from the mold, separate rods or tips on said plunger arranged to project into the mold and form initial blow openings in the glass in the mold, and means to guide said rods and cause them to approach each other within the mold as the plunger advances and to move apart as the plunger is withdrawn.

12. In a glass forming machine, the combination of a mold, means for forming separate openings in the plastic glass in the mold comprising a member having relative movement toward and from the mold, forming elements carried on said member to project into the mold, and means to guide said elements and cause their ends to approach while in the mold and to separate when said member is withdrawn from the mold.

13. In a glass forming machine, the combination of a neck mold comprising horizontally separable sections, a plunger movable vertically toward and from the mold, forming rods pivoted to the lower end of the plunger and depending therefrom in position to enter the mold as the plunger descends, and a guiding element carried by the neck mold and formed with guiding surfaces by which the lower ends of said forming rods are caused to approach as they enter the mold and to draw apart as they are withdrawn from the mold.

14. In a glass forming machine, the combination of a neck mold comprising horizontally separable sections, a plunger movable vertically toward and from the mold, forming rods pivoted to the lower end of the plunger and depending therefrom in position to enter the mold as the plunger descends, and means to move the lower ends of the rods toward and from each other while in the mold.

15. The method of forming a hollow glass container which consists in introducing a charge of plastic glass into a mold, forming initial blow openings extending from the surface of the glass inward, establishing communication between said openings through the interior of the glass, and blowing the glass to hollow form by air supplied through said openings.

16. The method of forming a hollow glass container which consists in introducing a charge of plastic glass into a mold, forming initial blow openings in the glass, uniting said openings by a passageway through the interior of the glass, and blowing the glass to hollow form by air under pressure supplied simultaneously through both said openings.

17. The method of forming a hollow glass article which consists in introducing plastic glass into a mold, forming initial blow openings in the glass, uniting said openings by a passageway through the interior of the glass, and blowing the glass to hollow form by air supplied through said openings.

18. The method of forming a hollow glass article which consists in introducing molten glass into a mold and shaping the glass around solid members within the mold, withdrawing said members, forming a passageway through the glass from one of the other of the openings left by the withdrawal of said members, and blowing the glass to hollow form by pneumatic pressure supplied through said openings.

19. The method of forming a glass bottle with separate openings through the neck thereof which consists in introducing a charge of glass into a mold, forming initial openings in the neck portion of the glass by means of mechanical forming devices within the neck of the mold, withdrawing said forming devices, and supplying pneumatic pressure simultaneously to the openings formed by said forming devices, and causing it to break through the glass between said openings and blow the glass to the form of a bottle.

20. A machine for blowing a hollow glass article having a plurality of outlet openings extending through the neck portion of the article, said machine comprising in combination a mold, mechanical means for forming said neck openings in a blank of glass within the mold, and means to supply air under pressure to said openings and blow the blank to its finished hollow form while retained in the mold.

21. A machine for blowing a hollow glass article having a plurality of outlet openings extending through the neck portion of the article, said machine comprising in combination a body blank mold, a neck mold, means for forming initial blow openings in a blank of glass in said molds, a finishing mold to enclose the blank while the latter is supported in the neck mold, and means to supply air under pressure to said blow openings and thereby blow the blank to its finished form in the finishing mold.

22. A machine for blowing a hollow glass article having a plurality of outlet openings extending through the neck portion of the article, said machine comprising in combination a body blank mold and a neck mold in which a blank of plastic glass is supported, means to open the blank mold, a finishing mold, means to close it around the blank while the latter is supported in the neck mold, and means to expand the blank to its hollow finished form including means to form openings through the neck of the blank, connect said openings and expand the glass in the finishing mold to form a hollow body having outlets through said neck openings.

Signed at Toledo, in the county of Lucas and State of Ohio, this 11th day of August, 1922.

JOHN F. RULE.